United States Patent
Palavalasa et al.

(10) Patent No.: US 12,278,732 B1
(45) Date of Patent: Apr. 15, 2025

(54) MECHANISM OF OBTAINING UP-TO-DATE NETWORK INVENTORY RELIABLY AND OPTIMALLY

(71) Applicant: Nokia Solutions and Networks Oy, Espoo (FI)

(72) Inventors: Mukesh Babu Palavalasa, Ontario (CA); Swaminathan Seetharaman, Chennai (IN); Vidya Raghunathan, Chennai (IN); Lakshmi Eswaran, Chennai (IN); Yves Beauville, Mortsel (BE); Ranjitha Barike Raghava, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/474,465

(22) Filed: Sep. 26, 2023

(51) Int. Cl.
| | |
|---|---|
| H04L 12/26 | (2006.01) |
| H04L 12/24 | (2006.01) |
| H04L 29/08 | (2006.01) |
| H04L 41/08 | (2022.01) |
| H04L 41/0853 | (2022.01) |
| H04L 41/0894 | (2022.01) |
| H04L 43/04 | (2022.01) |
| G06Q 10/08 | (2024.01) |
| G06Q 10/10 | (2023.01) |
| G06Q 30/00 | (2023.01) |

(52) U.S. Cl.
CPC ...... *H04L 41/0894* (2022.05); *H04L 41/0853* (2013.01); *H04L 41/0886* (2013.01)

(58) Field of Classification Search
CPC ............ H04L 41/0894; H04L 41/0853; H04L 41/0886; H04L 12/26; H04L 43/04; H04L 29/08; H04L 12/24; G06Q 30/00; G06Q 10/08; G06Q 10/10
USPC .......................................................... 709/220
See application file for complete search history.

(56) References Cited

U.S. PATENT DOCUMENTS

| | | | | |
|---|---|---|---|---|
| 7,783,607 | B2 * | 8/2010 | Cooper ................. | G06F 16/217 707/662 |
| 8,175,275 | B2 * | 5/2012 | Funnell ................... | H04L 47/34 380/273 |
| 9,779,382 | B1 * | 10/2017 | Chenault ................ | G06Q 30/06 |
| 2005/0101310 | A1 * | 5/2005 | Shachak ............. | H04M 1/2757 455/418 |
| 2016/0241996 | A1 * | 8/2016 | Bourque ............... | H04W 4/021 |
| 2017/0277716 | A1 * | 9/2017 | Giurgiu .................. | G06F 16/29 |
| 2017/0372264 | A1 * | 12/2017 | Tang .................... | G06Q 20/208 |
| 2018/0081956 | A1 * | 3/2018 | Xu ........................ | G06F 16/275 |
| 2018/0300680 | A1 * | 10/2018 | Undernehr .............. | G07F 9/026 |
| 2019/0146978 | A1 * | 5/2019 | Beedgen ................ | G06F 17/40 707/754 |

(Continued)

*Primary Examiner* — Jude Jean Gilles
(74) *Attorney, Agent, or Firm* — Harness, Dickey & Pierce, P.L.C.

(57) ABSTRACT

A network node may transmit a configuration message to at least one network device of a plurality of network devices, the configuration message including updated configuration information for the at least one network device, determine whether to update a network inventory system based on a response to the configuration message, and update a record included in the network inventory system associated with the at least one network device based on results of the determination, the updating including updating the record with the updated configuration information.

20 Claims, 6 Drawing Sheets

(56) References Cited

U.S. PATENT DOCUMENTS

| | | | |
|---|---|---|---|
| 2019/0258677 A1* | 8/2019 | Beedgen | G06F 16/90335 |
| 2021/0156401 A1* | 5/2021 | Cristofori | F15B 1/021 |
| 2023/0215473 A1* | 7/2023 | Cox | A63B 22/0235 |
| | | | 386/201 |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            SET ID = 2           |              LENGTH          |
+-+-+-+-+-+-+-+-+-+-+-+-+-+-+-+-+-+-+-+-+-+-+-+-+-+-+-+-+-+-+-+-+
|           TEMPLATE ID           |           FIELD COUNT        |
+-+-+-+-+-+-+-+-+-+-+-+-+-+-+-+-+-+-+-+-+-+-+-+-+-+-+-+-+-+-+-+-+
|          PRESENCE BITMAP        |         LENGTH = 65535       |
+-+-+-+-+-+-+-+-+-+-+-+-+-+-+-+-+-+-+-+-+-+-+-+-+-+-+-+-+-+-+-+-+
|       COLLECTION TIME STAMP     |         LENGTH = 65535       |
+-+-+-+-+-+-+-+-+-+-+-+-+-+-+-+-+-+-+-+-+-+-+-+-+-+-+-+-+-+-+-+-+
|      CACHE SEQUENCE NUMBER      |          LENGTH = 4          |
+-+-+-+-+-+-+-+-+-+-+-+-+-+-+-+-+-+-+-+-+-+-+-+-+-+-+-+-+-+-+-+-+
|           RECORD TYPE           |          LENGTH = 2          |
+-+-+-+-+-+-+-+-+-+-+-+-+-+-+-+-+-+-+-+-+-+-+-+-+-+-+-+-+-+-+-+-+
|           DELETE FLAG           |          LENGTH = 1          |
+-+-+-+-+-+-+-+-+-+-+-+-+-+-+-+-+-+-+-+-+-+-+-+-+-+-+-+-+-+-+-+-+
|           DATA FIELD 1          |         LENGTH = <M>         |
+-+-+-+-+-+-+-+-+-+-+-+-+-+-+-+-+-+-+-+-+-+-+-+-+-+-+-+-+-+-+-+-+
|               •••               |             •••              |
+-+-+-+-+-+-+-+-+-+-+-+-+-+-+-+-+-+-+-+-+-+-+-+-+-+-+-+-+-+-+-+-+
|           DATA FIELD N          |         LENGTH = <N>         |
+-+-+-+-+-+-+-+-+-+-+-+-+-+-+-+-+-+-+-+-+-+-+-+-+-+-+-+-+-+-+-+-+
|          LAST MSG FLAG          |          LENGTH = 1          |
+-+-+-+-+-+-+-+-+-+-+-+-+-+-+-+-+-+-+-+-+-+-+-+-+-+-+-+-+-+-+-+-+
```

FIG. 5

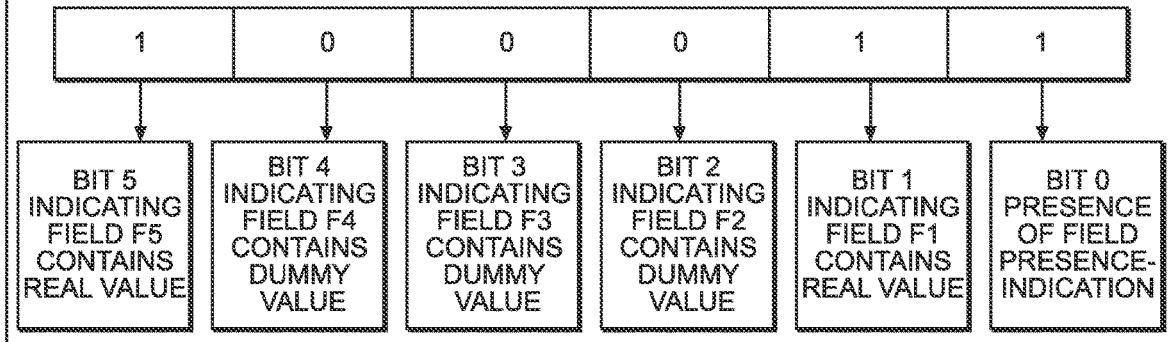

FIG. 6

MECHANISM OF OBTAINING UP-TO-DATE NETWORK INVENTORY RELIABLY AND OPTIMALLY

RELATED FIELD

Various example embodiments relate to methods, apparatuses, systems, and/or non-transitory computer readable media for reliably and/or optimally obtaining up-to-date network inventory information from a network inventory system.

BACKGROUND

Inventory data of devices connected to a network, such as end-user equipment, subscribers, network equipment, services, etc., are collected, maintained, and used by network operators, operations support system (OSS), domain orchestrators, end-to-end orchestrators, network applications, etc., for providing services associated with the network to end users, managing network traffic, performing network maintenance, and the like.

SUMMARY

At least one example embodiment relates to a network node.

In at least one example embodiment, the node may include a memory storing computer readable instructions, and processing circuitry configured to execute the computer readable instructions to cause the network node to, transmit a configuration message to at least one network device of a plurality of network devices, the configuration message including updated configuration information for the at least one network device, determine whether to update a network inventory system based on a response to the configuration message, and update a record included in the network inventory system associated with the at least one network device based on results of the determination, the updating including updating the record with the updated configuration information.

Some example embodiments provide that the network node is further caused to, receive an acknowledgement message from the at least one network device in response to the configuration message, and update the record associated with the at least one network device in response to the received acknowledgement message.

Some example embodiments provide that the network node is further caused to, receive a change message from the at least one network device, the change message including changed state information of the at least one network device and a cache sequence number associated with the at least one network device, determine whether the cache sequence number included in the change message is in sequence with a previous cache sequence number included in a last message received from the at least one network device, and update the record associated with the at least one network device in the network inventory system with the changed state information based on results of the determination.

Some example embodiments provide that the network node is further caused to, transmit a synchronization request to the at least one network device in response to the cache sequence number associated with the at least one network device included in the change message being out of sequence from the previous cache sequence number associated with the at least one network device, receive full state information from the at least one network device in response to the synchronization request, and update the record associated with the at least one network device in the network inventory system with the full state information.

Some example embodiments provide that the memory is configured to store the network inventory system.

Some example embodiments provide that the network inventory system is stored on a central network node, and the network node is further caused to update the network inventory system by transmitting a system update message to the central network node, the system update message including the update to the network inventory system.

Some example embodiments provide that the network node is further caused to, receive an audit message from the at least one network device based on a desired time period threshold and a length of time since a last transmitted message was sent by the at least one network device, the audit message being a copy of the last transmitted message sent by the at least one network device.

Some example embodiments provide that the network node is further caused to, transmit a synchronization request to the at least one network device in response to a cache sequence number included in a last received message associated with the at least one network device from the at least one network device not matching a cache sequence number in the last transmitted message associated with the at least one network device.

At least one example embodiment relates to a network node.

In at least one example embodiment, the node may include a memory storing computer readable instructions, and processing circuitry configured to execute the computer readable instructions to cause the network node to, transmit a configuration message to at least one network device of a plurality of network devices, the configuration message including updated configuration information for the at least one network device, determine whether to update a record associated with the at least one network device in a network inventory system based on a response to the configuration message, receive a change message from the at least one network device, the change message including changed state information of the at least one network device and a cache sequence number associated with the at least one network device, determine whether the cache sequence number included in the change message is in sequence with a previous cache sequence number included in a last message received from the at least one network device, and update the record associated with the at least one network device in the network inventory system with at least one of the changed state information and the updated configuration information based on results of the determinations.

Some example embodiments provide that the network node is further caused to, transmit a synchronization request to the at least one network device in response to the cache sequence number included in the change message being out of sequence from the previous cache sequence number associated with the at least one network device, receive full state information from the at least one network device in response to the synchronization request, and update the record associated with the at least one network device in the network inventory system with the full state information.

Some example embodiments provide that the network node is further caused to, receive an acknowledgement message from the at least one network device in response to the configuration message, and update the record associated with the at least one network device in response to the received acknowledgement message.

Some example embodiments provide that the memory is configured to store the network inventory system.

Some example embodiments provide that the network inventory system is stored on a central network node, and the network node is further caused to update the network inventory system by transmitting a system update message to the central network node, the system update message including the update to the network inventory system.

Some example embodiments provide that the network node is further caused to, receive an audit message from the at least one network device based on a desired time period threshold and a length of time since a last transmitted message was sent by the at least one network device, the audit message being a copy of the last transmitted message sent by the at least one network device.

Some example embodiments provide that the network node is further caused to, transmit a synchronization request to the at least one network device in response to a cache sequence number included in a last received message from the at least one network device not matching a cache sequence number in the last transmitted message associated with the at least one network device.

At least one example embodiment relates to a network device.

In at least one example embodiment, the device may include memory storing computer readable instructions, and processing circuitry configured to execute the computer readable instructions to cause the network device to, determine whether a change in state has occurred in the network device, and transmit a change message to a network node in response to the determined change in state of the network device, the change message including changed state information of the network device and a cache sequence number associated with the network device, the change message enabling the network node to, determine whether the cache sequence number included in the change message is in sequence with a previous cache sequence number included in a last message received from the network device, and update a record associated with the network device included in a network inventory system with the changed state information based on results of the determination.

Some example embodiments provide that the network device is further caused to, receive a synchronization request from the network node in response to the cache sequence number included in the change message not being in sequence with the previous cache sequence number.

Some example embodiments provide that the network device is further caused to, transmit full state information to the network node, the transmitting enabling the network node to, update the record associated with the network device in the network inventory system with the full state information of the network device.

Some example embodiments provide that the network device is further caused to, receive a configuration message from the network node, the configuration message including updated configuration information for the network device, and transmit an acknowledgement message to the network node in response to the configuration message, the transmitting the acknowledgement message enabling the network node to, update the record associated with the network device in response to the transmitted acknowledgement message, the updating the network inventory system including updating the configuration information for the network device stored in the network inventory system.

Some example embodiments provide that the network device is further caused to, transmit an audit message to the network node based on a desired time period threshold and a length of time since a last transmitted message was sent by the network device, the audit message being a copy of a last transmitted message sent by the network device, and receive a synchronization request from the network node in response to a cache sequence number included in a last received message received by the network node from the network device not matching a cache sequence number in the last transmitted message. At least one example embodiment relates to a network node.

In at least one example embodiment, the node may include means for transmitting a configuration message to at least one network device of a plurality of network devices, the configuration message including updated configuration information for the at least one network device, determining whether to update a network inventory system based on a response to the configuration message, and updating a record included in the network inventory system associated with the at least one network device based on results of the determination, the updating including updating the record with the updated configuration information.

Some example embodiments provide that the network node further includes means for, receiving an acknowledgement message from the at least one network device in response to the configuration message, and updating the record associated with the at least one network device in response to the received acknowledgement message.

Some example embodiments provide that the network node further includes means for, receiving a change message from the at least one network device, the change message including changed state information of the at least one network device and a cache sequence number associated with the at least one network device, determining whether the cache sequence number included in the change message is in sequence with a previous cache sequence number included in a last message received from the at least one network device, and updating the record associated with the at least one network device in the network inventory system with the changed state information based on results of the determination.

Some example embodiments provide that the network node further includes means for, transmitting a synchronization request to the at least one network device in response to the cache sequence number associated with the at least one network device included in the change message being out of sequence from the previous cache sequence number associated with the at least one network device, receiving full state information from the at least one network device in response to the synchronization request, and updating the record associated with the at least one network device in the network inventory system with the full state information.

Some example embodiments provide that the network node further includes means for means for storing the network inventory system.

Some example embodiments provide that the network inventory system is stored on a central network node, and the network node further includes means for updating the network inventory system by transmitting a system update message to the central network node, the system update message including the update to the network inventory system.

Some example embodiments provide that the network node further includes means for, receiving an audit message from the at least one network device based on a desired time period threshold and a length of time since a last transmitted message was sent by the at least one network device, the audit message being a copy of the last transmitted message sent by the at least one network device.

Some example embodiments provide that the network node further includes means for, transmitting a synchronization request to the at least one network device in response to a cache sequence number included in a last received message associated with the at least one network device from the at least one network device not matching a cache sequence number in the last transmitted message associated with the at least one network device.

At least one example embodiment relates to a network node.

In at least one example embodiment, the node may include means for, transmitting a configuration message to at least one network device of a plurality of network devices, the configuration message including updated configuration information for the at least one network device, determining whether to update a record associated with the at least one network device in a network inventory system based on a response to the configuration message, receiving a change message from the at least one network device, the change message including changed state information of the at least one network device and a cache sequence number associated with the at least one network device, determining whether the cache sequence number included in the change message is in sequence with a previous cache sequence number included in a last message received from the at least one network device, and updating the record associated with the at least one network device in the network inventory system with at least one of the changed state information and the updated configuration information based on results of the determinations.

Some example embodiments provide that the network node further includes means for, transmitting a synchronization request to the at least one network device in response to the cache sequence number included in the change message being out of sequence from the previous cache sequence number associated with the at least one network device, receiving full state information from the at least one network device in response to the synchronization request, and updating the record associated with the at least one network device in the network inventory system with the full state information.

Some example embodiments provide that the network node further includes means for, receiving an acknowledgement message from the at least one network device in response to the configuration message, and updating the record associated with the at least one network device in response to the received acknowledgement message.

Some example embodiments provide that the network node further includes means for storing the network inventory system.

Some example embodiments provide that the network inventory system is stored on a central network node, and the network node further includes means for updating the network inventory system by transmitting a system update message to the central network node, the system update message including the update to the network inventory system.

Some example embodiments provide that the network node further includes means for, receiving an audit message from the at least one network device based on a desired time period threshold and a length of time since a last transmitted message was sent by the at least one network device, the audit message being a copy of the last transmitted message sent by the at least one network device.

Some example embodiments provide that the network node further includes means for, transmitting a synchronization request to the at least one network device in response to a cache sequence number included in a last received message from the at least one network device not matching a cache sequence number in the last transmitted message associated with the at least one network device.

At least one example embodiment relates to a network device.

In at least one example embodiment, the device may include means for, determining whether a change in state has occurred in the network device, and transmitting a change message to a network node in response to the determined change in state of the network device, the change message including changed state information of the network device and a cache sequence number associated with the network device, the change message enabling the network node to, determine whether the cache sequence number included in the change message is in sequence with a previous cache sequence number included in a last message received from the network device, and update a record associated with the network device included in a network inventory system with the changed state information based on results of the determination.

Some example embodiments provide that the network device further includes means for, receiving a synchronization request from the network node in response to the cache sequence number included in the change message not being in sequence with the previous cache sequence number.

Some example embodiments provide that the network device further includes means for, transmitting full state information to the network node, the transmitting enabling the network node to, update the record associated with the network device in the network inventory system with the full state information of the network device.

Some example embodiments provide that the network device further includes means for, receiving a configuration message from the network node, the configuration message including updated configuration information for the network device, and transmitting an acknowledgement message to the network node in response to the configuration message, the transmitting the acknowledgement message enabling the network node to, update the record associated with the network device in response to the transmitted acknowledgement message, the updating the network inventory system including updating the configuration information for the network device stored in the network inventory system.

Some example embodiments provide that the network device further includes means for, transmitting an audit message to the network node based on a desired time period threshold and a length of time since a last transmitted message was sent by the network device, the audit message being a copy of a last transmitted message sent by the network device, and receiving a synchronization request from the network node in response to a cache sequence number included in a last received message received by the network node from the network device not matching a cache sequence number in the last transmitted message.

BRIEF DESCRIPTION OF THE DRAWINGS

The accompanying drawings, which are incorporated in and constitute a part of the specification, illustrate one or more example embodiments and, together with the description, explain these example embodiments. In the drawings:

FIG. 5 illustrates an example cache template layout as stored on the inventory system according to at least one example embodiment; and FIG. 6 illustrates an example compressed message format according to at least one example embodiment.

DETAILED DESCRIPTION

Figure 1:
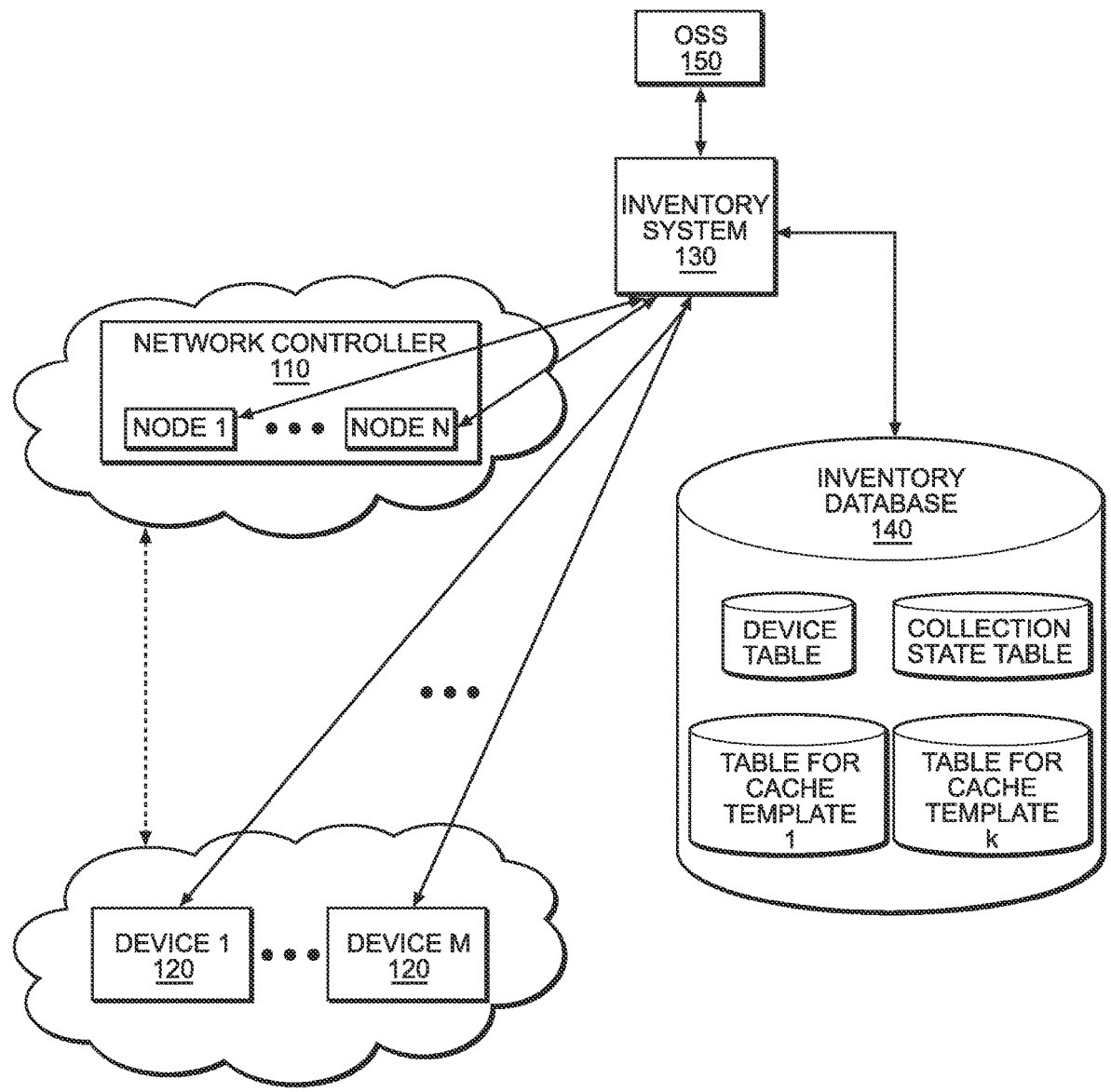
FIG. 1 illustrates a network inventory system according to at least one example embodiment.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

Various example embodiments will now be described more fully with reference to the accompanying drawings in which some example embodiments are illustrated.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments configured forth herein.

It will be understood that, although the terms first, second, and so on may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent").

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures illustrated in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be illustrated in block diagrams in order not to obscure the example embodiments in unnecessary detail. In other instances, well-known processes, structures and techniques may be illustrated without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, and/or a subprogram. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, and/or hardware description languages, in combination with hardware (e.g., software executed by hardware). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, and/or data, may be passed, forwarded, or transmitted via any suitable means including memory sharing, message passing, token passing, and/or network transmission.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, or an application-specific integrated circuit (ASIC).

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Various example embodiments are directed towards reliably and/or optimally obtaining up-to-date network inventory information from a network inventory system.

In order to provide network services, manage network traffic conditions, meet quality of service (QOS) conditions, etc., network operators, OSS, domain orchestrators, end-to-end orchestrators, etc., (hereinafter referred to as operators) desire and/or require up-to-date (e.g., real-time and/or near real-time) inventory information regarding network devices connected to their network. For example, operators may desire and/or require configuration information (e.g., end-user information, end-user equipment information, service subscription information, service QoS information, home network information, roaming information, firmware version, software version, hardware version, hardware equipment installed, etc.) and/or state-related information (e.g., device power status (e.g., power on/power off/sleep mode, etc.), connectivity information, network upload/download speed information, IP address, MAC address, serial number, etc.) regarding all of the network equipment installed on the network. Examples of network equipment may include, for example, end-user client devices (e.g., personal computers, laptops, servers, smartphones, tablets, other smart devices, Internet of Thing (IoT) devices, autonomous devices, medical devices, sensors, security cameras, drones, vehicles, and/or any other computing device capable of connecting to a wired and/or wireless network. Further, the network equipment may also include networking equipment connected to and/or supporting the network, such as routers, switches, base stations, radio access network (RAN) nodes, cells, fixed access network nodes, packet core network nodes, etc.

However, conventional network inventory systems suffer from several deficiencies, such as an inability to provide up-to-date configuration information and/or state information regarding network devices, failure to guarantee that inventory information is correct and/or to detect loss of change in inventory information messages in a timely manner (e.g., within a desired time interval), inability to ensure alignment of inventory data stored in an edge inventory node and a central inventory node, inability to provide timely detection of inaccuracies in inventory information, failure to provide fallback inventory information due to connectivity issues with network devices, and/or network performance issues wherein updates to the network inventory system incurred significant network resource overhead, etc. For example, some conventional network inventory systems collected inventory data periodically from network devices using the Netconf protocol and/or other proprietary protocols. However, the conventional approach only provided a snapshot (e.g., periodic) view of inventory and did not provide an up-to-date (e.g., real-time and/or near real-time) view of the network inventory. Further, the conventional approach consisted of retrieving the inventory data from all network devices at the same periodic interval, thereby requiring significant network resource usage whenever the inventory polling messages were transmitted and received by the conventional network inventory system. Additionally, if the period of time between updates were shortened in an attempt to provide more up-to-date inventory information, the network resource usage would correspondingly increase due to the increase in network traffic due to the inventory information updates. Moreover, the conventional network inventory systems failed to provide a fallback mechanism in case inventory-related messages were lost due to data connectivity issues between the network device and the inventory system controller and/or due to the network device being powered off and/or otherwise unavailable during an inventory update polling event, etc.

Accordingly, various example embodiments provide a network inventory system which provides reliable, up-to-date inventory information on a real-time and/or near real-time basis, a network inventory system which provides an improved communication protocol thereby providing failsafe and/or fail-over procedures so that inventory information updates and/or changes are reliably committed to the network inventory system and failures by network equipment and/or a network controller to provide inventory information updates are detected in a timely manner, and/or reduced network resource usage by the network inventory system, etc.

FIG. 1 illustrates a network inventory system according to at least one example embodiment. As illustrated in FIG. 1, a network inventory system includes a network controller 110, at least one network device 120, an inventory system 130, an inventory database 140, and/or an operations support system (OSS) 150, but the example embodiments are not limited thereto, and for example, a greater or lesser number of constituent components may be included in the network inventory system. For example, according to some example embodiments, the inventory system 130 may include the inventory database 140, the network controller 110 may include the inventory system 130 and/or the OSS 150, etc.

The network controller 110, the network devices 120, the inventory system 130, the inventory database 140, and/or the OSS 150, etc., may be connected over a wireless network, such as a cellular wireless access network (e.g., a 3G wireless access network, a 4G-Long Term Evolution (LTE) network, a 5G-New Radio (e.g., 5G) wireless network, a 6G network, a 7G network, a Wi Fi network), a satellite communication network, and/or a wired network, such as a fiber-optic network, a copper wire network, and/or other fixed access networks, but are not limited thereto. The wireless network and/or wired network may each be associated with a network operator, e.g., a mobile network operator (MNO), a public land mobile network (PLMN), a fixed access network operator, etc., but the example embodiments are not limited thereto.

The network controller 110 may be a centralized network controller (e.g., a single network controller) and/or a distributed network controller including a plurality of network nodes 1 (e.g., a central network controller) connected to at least one additional network node N (e.g., connected to one or more edge network controllers, etc.), but the example embodiments are not limited thereto. Further, according to some example embodiments, the network controller 110 may be a software defined network (SDN) controller, etc. Moreover, network nodes may operate as and/or may be collocated with a RAN node, a base station, a cell tower, a transmission and reception point (TRP), an access point, a network router, a network switch, an optical line terminal (OLT), an optical network unit (ONU), an optical network terminal (ONT), an optical distribution network (ODN), a cable modem, etc., and may connect to other RAN nodes, network functions, network services, core network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF) in, for example, a 5G network, etc., OLT providing functions in a fixed access network, such as QoS management, L2 forwarding, etc., over the wired and/or wireless network, as well as the network devices 120.

The network devices 120 may be any one of, but are not limited to, networking equipment, such as switches, routers, TRPs, OLTs, etc., owned, operated, and/or maintained by a network operator, etc., and/or end-user a mobile device, a smartphone, a tablet, a personal computer, a laptop computer, a wearable device, an Internet of Things (IoT) device, a vehicle, and/or any other type of stationary or portable device capable of operating according to the wired access technology (e.g., Ethernet, etc.) and/or the radio access technology (RAT) (e.g., 5G NR RAT, WiFi, etc.). According to some example embodiments, the network devices 120 may also include end-user networking equipment, such as routers, switches, etc., installed at a residential home, a commercial building, a warehouse, etc.

The inventory system 130 may be a centralized inventory system or a distributed inventory system. The inventory system 130 may be external to and/or separate from the network controller 110, the inventory system 130 may be co-located with the network controller 110, e.g., the network controller 110 may include and/or run, execute, etc., the inventory system 130, and in the case of a distributed inventory system, a first network node 1 included in the network controller 110 may include, run, and/or execute a central inventory system and one or more edge network nodes may include, run, and/or execute one or more edge inventory systems, etc. The inventory system 130 may receive inventory data queries from the network operator (not shown), the OSS 150 (e.g., network services, network functions, network applications, and the like), the network controller 110, and/or from the network devices 120, and transmit up-to-date inventory information in response to the inventory data queries. Additionally, the inventory system 130 may receive information of configuration pertaining to one or more of the network devices 120, e.g., changes in network configuration settings and/or information for the network devices 120, firmware and/or software updates for the network devices 120, instructions for the network devices 120, etc. The inventory system 130 may also receive change messages from one or more of the network devices 120 indicating changes and/or modifications of the state information and/or operational status of the one or more network devices 120, such as initiation of a shutdown/power down operation, completion of a power on/reboot operation, initiation of a software upgrade, changes in hardware components, disconnection/reconnection of data connectivity to the network, change in IP address, etc., but the example embodiments are not limited thereto.

In turn, the inventory system 130 may retrieve data and/or transmit data from/to an inventory database 140 in response to inventory query messages, configuration update messages/state change messages, etc. According to at least one example embodiment, the inventory database 140 may store inventory information including configuration information and/or state information associated with each of the network devices 120 connected to and/or subscribed to the network, but the example embodiments are not limited thereto, and for example, other information regarding the network devices 120 may also be stored in the inventory database 140. Additionally, according to some example embodiments, the inventory information may be stored in the inventory database 140 as a Yang tree, JavaScript Object Notation (JSON) format, extensible markup language (XML), but is not limited thereto, and for example, the inventory database may be configured as a SQL database, a no-SQL database, other relational databases, other tree data structures, other data structures, etc. The inventory database 140 (also referred as inventory DB) may store, for example, one or more device tables storing details of the network devices 120 such as a device identifier, name, type (e.g., fiber, copper, etc.), vendor name, software version, firmware version, hardware configuration information (e.g., a list of hardware components installed, etc.), a list of cache templates associated with the network device, etc., one or more collection state tables for storing and/or maintaining cache sequence numbers and/or the full-synchronization status of each cache template for each network device 120, and/or a plurality of cache templates, wherein each of the cache templates are associated with one of the network devices 120, etc., but the example embodiments are not limited thereto. According to at least one example embodiment, a cache template includes a set of inventory attributes associated with the same resource in a network device (for example, for physical inventory, e.g., a port, a card, a shelf, a channel-termination, etc.) and/or a set of closely related inventory attributes (for example, for logical inventory, e.g., services, etc.) wherein the data for all of the attributes present are provided by the same data source, for example, a network device or a device manager. The inventory attributes included in a cache template could be stored in YANG leaves in the same YANG tree, but the example embodiments are not limited thereto.

For example, configuration attributes of a network interface could form a cache template (and, for example, this data may be provided by a Device Manager and/or the network controller 110, etc.), and state attributes of a network interface could form another cache template (and, for example, the state data for this may be provided by the individual network device 120), but the example embodiments are not limited thereto. Additionally, each of the cache templates may also include the data source and other information of relevance to the inventory system 130 for it to function effectively and efficiently (e.g., a list of attributes which are queried for frequently by the OSS 150, etc.).

According to some example embodiments, the cache template specifies and/or defines the granularity of the full synchronization messages, change messages and audit messages, and may also determine their layout (e.g., the attributes to be included in responses to the full synchronization messages, change messages, audit messages, etc.).

Additionally, the inventory database 140 may also include at least one table for each cache template that is configured for one or more network devices 120, such as table(s) storing the inventory data records corresponding to the specific cache template. As an example, with reference to FIG. 1, the table for cache template 1 may store the inventory data records corresponding to cache template 1, the table for cache template k may store the inventory data records corresponding to cache template k, and so on.

While certain components of a network inventory system are illustrated as being part of the network inventory system of FIG. 1, the example embodiments are not limited thereto, and the network inventory system may include components other than those illustrated in FIG. 1, which are desired, necessary, and/or beneficial for operation of the underlying networks within the network inventory system, such as access points, switches, routers, nodes, servers, gateways, and other components, units, or devices.

Figure 2:
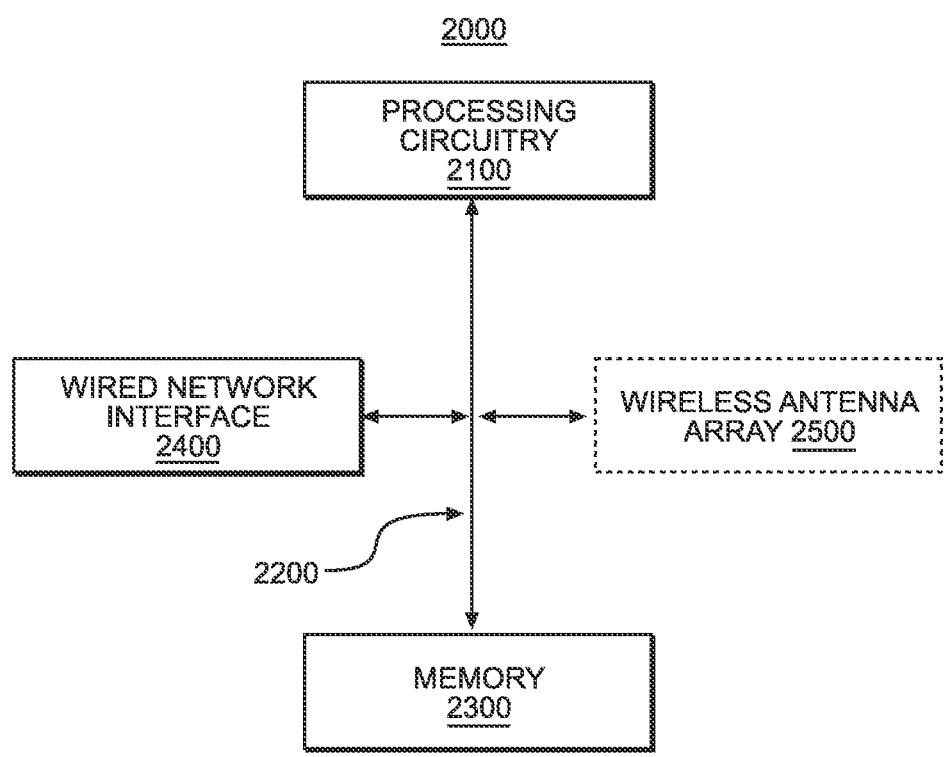
FIG. 2 illustrates a block diagram of an example network node and/or network device according to at least one example embodiment.

FIG. 2 illustrates a block diagram of an example network node and/or example network device according to at least one example embodiment. The network node 2000 of FIG. 2 may correspond to the network controller 110, the inventory system 130, and/or the network device 120 in FIG. 1, but the example embodiments are not limited thereto.

Referring to FIG. 2, a network node 2000 may include processing circuitry, such as processing circuitry 2100, at least one communication bus 2200, a memory 2300, at least one wired network interface 2400, and/or at least one wireless antenna array 2500, but the example embodiments are not limited thereto. For example, the wired network interface 2400 and the wireless antenna array 2500 may be combined into a single network interface, or the network node 2000 may include a plurality of wireless antenna arrays, a plurality of wired network interfaces, and/or any combinations thereof. According to at least one example embodiment, the wireless antenna array 2500 may be omitted. The memory 2300 may include various special purpose program code including computer executable instructions which may cause the network node 2000 to perform one or more of the methods of the example embodiments.

In at least one example embodiment, the processing circuitry 2100 may include at least one processor (and/or processor cores, distributed processors, and networked processors), which may be configured to control one or more elements of the network node 2000, and thereby cause the network node 2000 to perform various operations. The processing circuitry 2100 is configured to execute processes by retrieving program code (e.g., computer readable instructions) and data from the memory 2300 to process them, thereby executing special purpose control and functions of the entire network node 2000. Once the special purpose program instructions are loaded into the processing circuitry 2100, the processing circuitry 2100 executes the special purpose program instructions, thereby transforming the processing circuitry 2100 into a special purpose processor.

In at least one example embodiment, the memory 2300 may be a non-transitory computer-readable storage medium and may include a random access memory (RAM), a read only memory (ROM), and/or a non-volatile mass storage device, such as a disk drive, a solid state drive, a tape drive, etc. Stored in the memory 2300 is program code (e.g., computer readable instructions) related to operating the network node 2000, such as the methods discussed in connection with FIG. 3, the at least one wired network interface 2400, and/or at least one wireless antenna array 2500. Such software elements may be loaded from a non-transitory computer-readable storage medium independent of the memory 2300, using a drive mechanism (not illustrated) connected to the network node 2000, via the at least one wired network interface 2400, and/or at least one wireless antenna array 2500.

In at least one example embodiment, the communication bus 2200 may enable communication and data transmission to be performed between elements of the network node 2000. The bus 2200 may be implemented using a high-speed serial bus, a parallel bus, and/or any other appropriate communication technology. According to at least one example embodiment, the network node 2000 may include a plurality of communication buses (not illustrated), such as an address bus, a data bus, and so on.

When the network node 2000 operates as a network controller (e.g., the network controller 110, a SDN controller, etc.), the memory 2300 may further store program code and/or computer readable instructions associated with the inventory system 130, one or more device managers configured to manage one or more of the network devices 120, and/or a user interface (UI)/northbound interfaces (NBI) interface, but is not limited thereto. Further, the memory 2300 may also store the inventory database 140, etc., but is not limited thereto.

In the event that the network node 2000 operates as part of a distributed inventory system, e.g., a central network node operating as a central network controller and one or more edge network nodes operating as edge network controllers, each of the edge network nodes may independently store and maintain a local copy (e.g., a cache copy) of the inventory database corresponding to the network devices associated with the particular edge network node and the central network node stores and maintains a central copy of the inventory database and receives updates regarding the network devices from the respective edge network nodes. According to some example embodiments, the messages transmitted between the edge network nodes and the central network nodes may be transmitted using the Kafka messaging protocol and/or the IPFIX messaging protocol, but the example embodiments are not limited thereto. Further, the central network node may support API calls to query the central inventory database, manages the central inventory database with creation of new inventory data records corresponding to new network devices added to the network, changes (e.g., updates and/or modifications) to existing inventory data records corresponding to existing network devices, deletions to existing inventory data records corresponding to the removal of existing network devices from the network, etc. As an example, the central network node may update existing inventory data records based on and/or in response to change messages received from network devices and/or forwarded from edge network nodes, the change messages indicating changes in the configuration information and/or state information of the network devices, etc.

The edge network nodes may store and manage a local and/or edge inventory database which receive change messages from network devices connected to, assigned to, and/or managed by the edge network node, generate configuration update messages for the network devices associated with the edge network node, and/or forward configuration update messages from the central network node to the network devices associated with the edge network node. Additionally, when the edge network node receives a change message from the network devices, the edge network node forwards the change message to the central network node via, for example, OSS and/or NBI interfaces to ensure alignment between the data records (e.g., data entries, etc., hereinafter referred to as data records) associated with the network device stored in the edge network node inventory database and the central network node inventory database, as well as to reduce the network resource usage and/or network overhead. According to some example embodiments, the messages transmitted between the devices and the edge network nodes may be transmitted using the Netconf and/or the IPFIX messaging protocols, but the example embodiments are not limited thereto.

When the central network node transmits a synchronization request message (e.g., a full synchronization message, a sync message, a full-sync message, etc.), the edge network node may compute differences between the data records for the network devices associated with the edge network node stored on its local copy of the inventory database and the corresponding data records for the network devices stored on the central inventory database, and if differences between the two copies are detected, the edge network node may transmit at least one change message to the central network node indicating the differences in the data records, thereby causing the central network node to update its data records to be in accordance with the data records stored on the edge network node, and ensuring alignment between the edge and central inventory databases. In another embodiment, when the central network node transmits a synchronization request message (e.g., a full synchronization message, a sync message, a full-sync message, etc.) for a network device for one or more cache templates associated with the network device, the edge network node may send all of the inventory data for the relevant network device for the applicable cache templates associated with the network device, and the central network node then updates the central inventory database to ensure alignment with the inventory data associated with the network device stored in the edge network node. Additionally, in the event that the central inventory database has to be rebuilt due to a catastrophic failure at the central network node (e.g., disaster recovery), the central network node may transmit a synchronization message to every edge network node for every cache template associated with every network device associated with each of the edge network nodes to rebuild the central inventory database. Further, in the event that an edge inventory database has to be rebuilt due to catastrophic failure at the edge network node, the edge network node may transmit a synchronization message to the central network node, and the local inventory database at the edge network node may be rebuilt based on inventory data stored in the central inventory database.

Further, the edge network nodes may periodically transmit audit messages to the central inventory databases, similar to the audit messages transmitted by network devices to the central inventory database as discussed in connection with FIG. 3. More specifically, the edge network node will re-send in the audit message for a particular network device for a particular cache template, the last sent cache sequence number (e.g., in a change message or a full sync message) for the particular network device for the particular cache template to the central network node, e.g., after a desired time period has expired and if it has not transmitted a new change message to the central network node within the desired time period (for the relevant cache template for the network device). For example, if the desired time period is set to, e.g., 30 minutes, after the expiration of the desired time period, the edge network device determines whether it sent a new change message to the central network node within the previous 30 minutes for the desired cache template for the desired network device, and if not, the edge network device will transmit the audit message to the central network node, but the example embodiments are not limited thereto, and for example, the edge network device may reset the desired time period after sending each new change message and will send the audit message if no new change messages have been sent within the previous 30 minutes, etc. The central network node will determine whether the cache sequence number in the audit message received from the edge network node matches the cache sequence number in the last change message and/or full synchronization message received from the edge network node for the relevant network node and the relevant cache template, but the example embodiments are not limited thereto. If the cache sequence numbers do not match, then the central network node determines that one or more change messages from the edge network node have been lost, dropped, discarded, etc., and the central network node will transmit a full synchronization message to the edge network node, thereby improving the reliability of the network inventory system.

In a similar way, each of the network devices 120 may send a periodic audit message to the edge network node (e.g., when the inventory system is distributed) or to the network controller 110 and/or inventory system 130 (e.g., when the inventory system is centralized) for every cache template configured in the respective network device. Such an audit message will contain the cache sequence number sent in the last change message and/or full synchronization message sent to the edge network node, network controller 110 and/or inventory system 130, etc. The audit message will enable the edge network node (e.g., when the inventory system is distributed) or the network controller 110 and/or inventory system 130 (e.g., when the inventory system is centralized) to determine if one or more change messages from the network device for a desired cache template have been lost, dropped, discarded, etc. If it is determined that one or more change messages from the network device have been lost, dropped, discarded, etc., the edge network node, or the network controller 110 and/or inventory system 130 will transmit a full synchronization message to the network device for the relevant cache templates, thereby improving the reliability of the network inventory system.

According to some example embodiments, the audit message will be compressed and/or optimal content, such that instead of sending an exact copy of the previous transmitted change message, only the cache sequence number is transmitted to the central network node (e.g., network controller 110 and/or inventory system 130) and a flag (e.g., a bit) indicating that the message is an audit message, and all other data fields are empty, NULL, and/or filled with dummy values, to reduce the amount of data transmitted between the edge network node and the central network node and/or to reduce the amount of processing performed by the central network node, etc., but the example embodiments are not limited thereto. A similar mechanism of sending a reduced amount of data and/or sending only the optimal content in an audit message from the network device 120 to the edge network node (e.g., when the inventory system is distributed) or to the network controller 110 and/or inventory system 130 (e.g., when the inventory system is centralized) may be followed to reduce the amount of data transmitted between the device edge network node/inventory system and/or to reduce the amount of processing performed by the edge network node/inventory system, etc.

When the network node 2000 operates as a network device (e.g., the network device 120), the memory 2300 may further store program code and/or computer readable instructions associated with the functions of the network device, including for example, transmission of change messages to the inventory system 130 and/or receipt of configuration update messages from the inventory system 130. Further discussion of the inventory messages will be discussed in connection with FIGS. 3 to 6.

The network node 2000 may communicate with a core network (e.g., backend network, backhaul network, backbone network, data network, or another network) of a wireless communication network and/or a wired communication network via a wired network interface 2400. The wired network interface 2400 may be a wired and/or wireless network interface and may enable the network node 2000 to communicate and/or transmit data to and from to network devices on the backend network, such as a wired network gateway (not illustrated), a data network, such as the Internet, intranets, wide area networks, telephone networks, and/or VoIP networks.

While FIG. 2 depicts an example embodiment of a network node 2000 which may operate as a network controller, SDN controller, inventory system, and/or a network device, the example embodiments are not limited thereto, and may include additional and/or alternative architectures that may be suitable for the purposes demonstrated. For example, the functionality of the network node 2000 may be divided among a plurality of physical, logical, and/or virtual network elements.

Figure 3A:
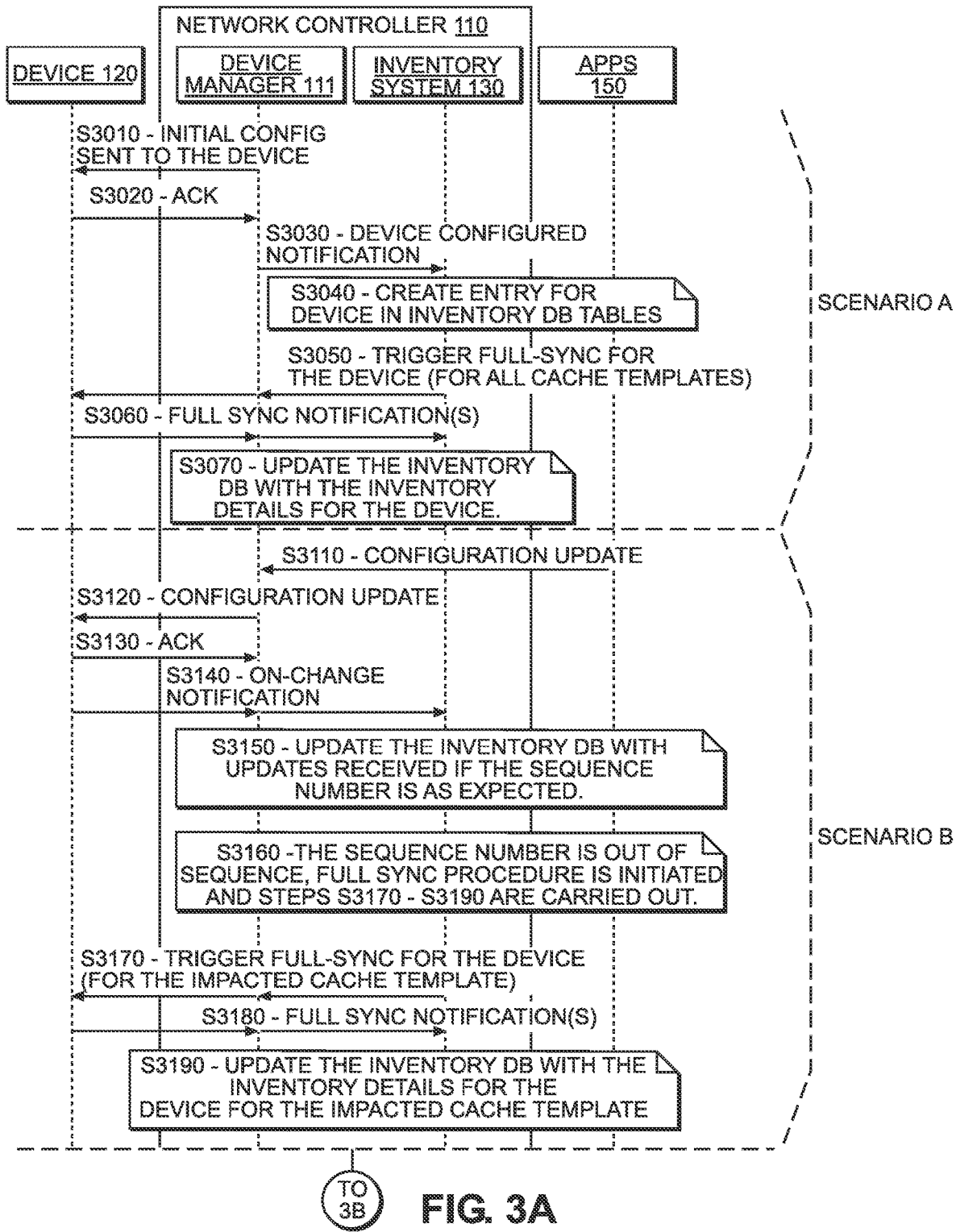
FIG. 3 is an example transmission diagram according to at least one example embodiment.
Figure 3B:
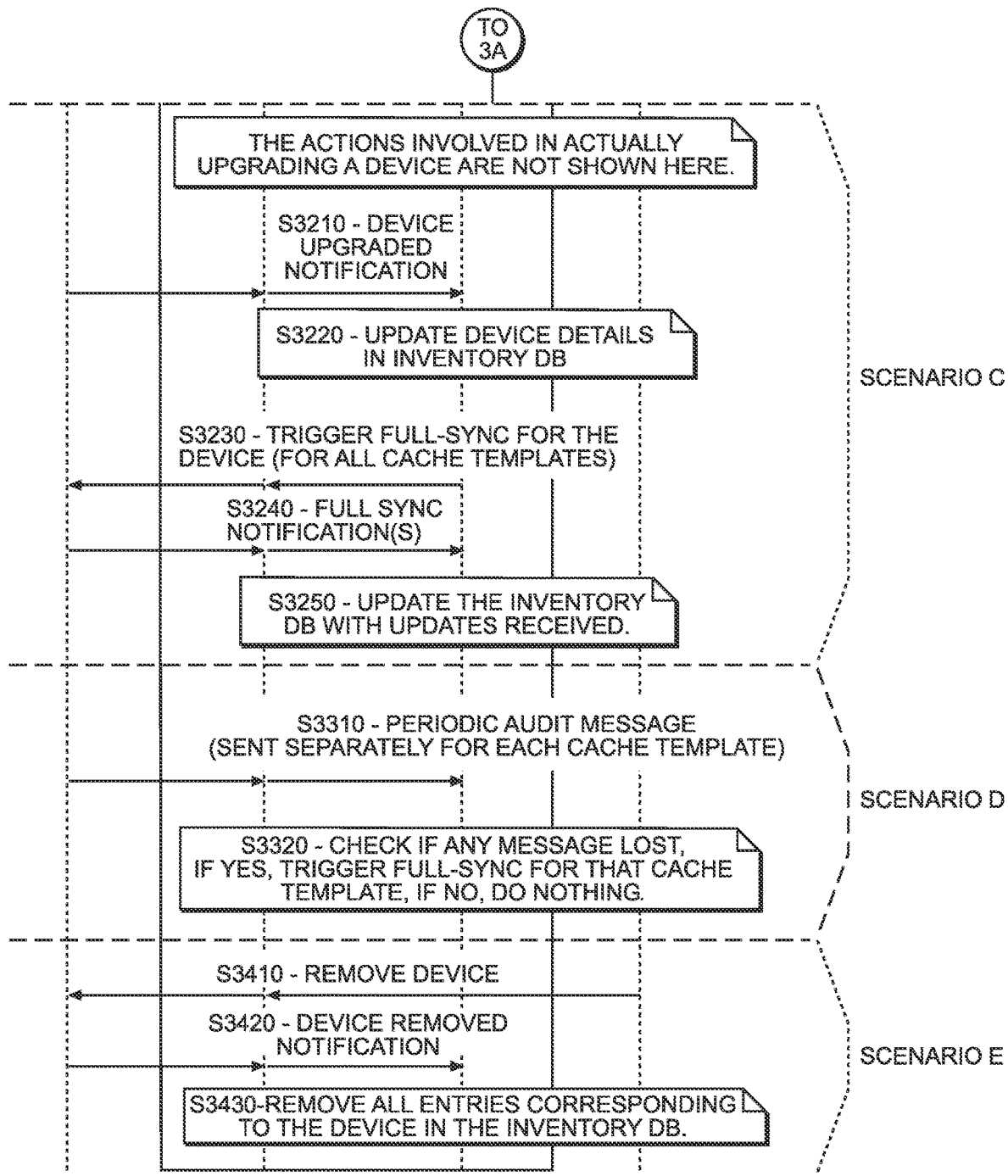
Figure 4:
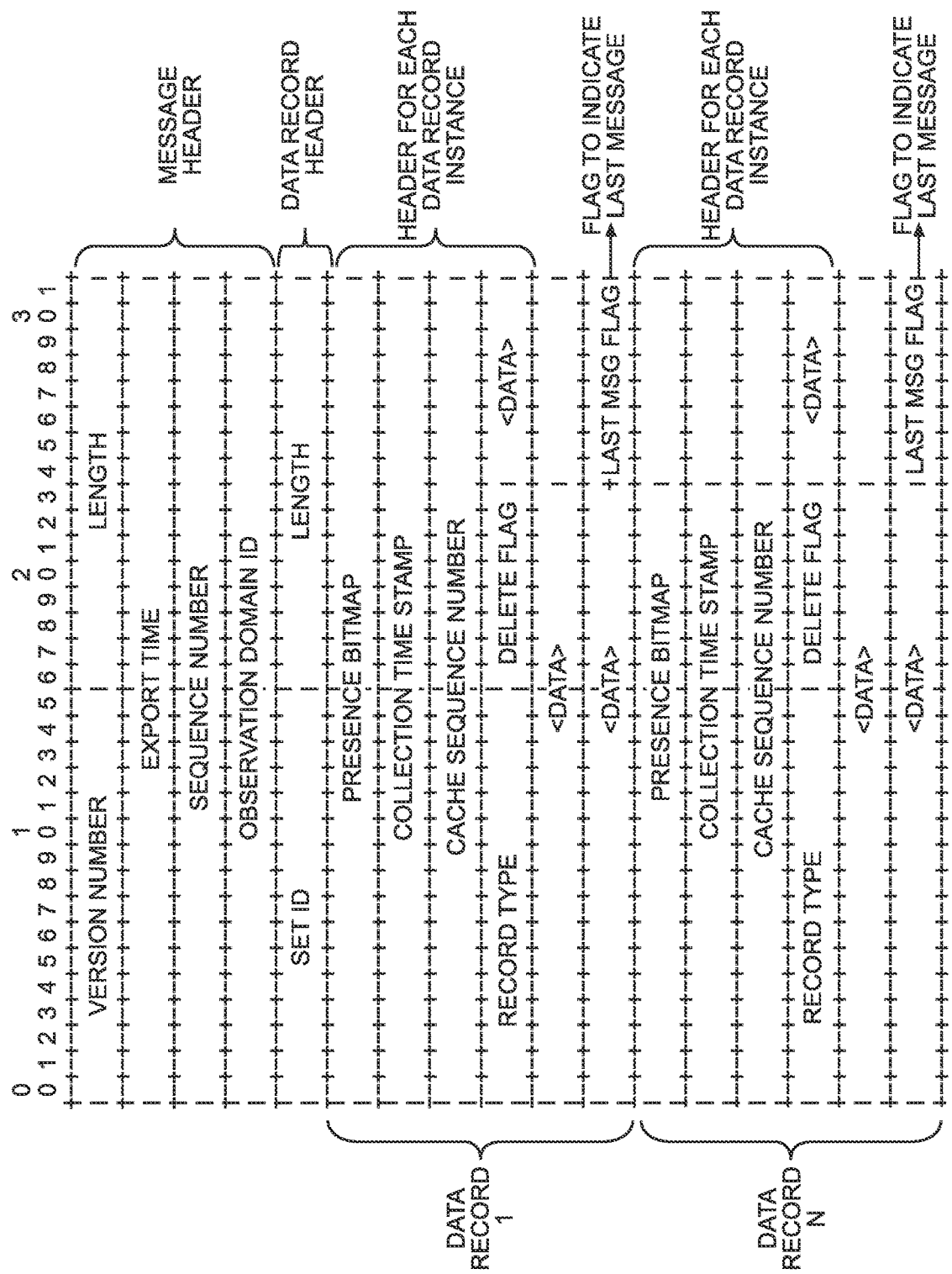
FIG. 4 illustrates an example message format for a message transmitted by the network device according to at least one example embodiment.

FIG. 3 illustrates an example transmission diagram illustrating a method of obtaining up-to-date network inventory information according to at least one example embodiment. Additionally, FIG. 4 illustrates an example message format for a message transmitted by the network device according to at least one example embodiment, FIG. 5 illustrates an example cache template layout as stored on the inventory system which specifies an example layout of the change, audit, and/or full synchronization message for an example cache template sent from the network device 120 and/or the network controller 110 (and/or device manager 111, etc.) according to at least one example embodiment, and FIG. 6 illustrates an example compressed message format according to at least one example embodiment, but the example embodiments are not limited thereto.

While a single network controller and network device is shown in FIG. 3, the example embodiments are not limited thereto, and for example, a plurality of network controllers (e.g., a central network controller and at least one edge network controller) and/or a plurality of network devices may be included in the network inventory system. Additionally, the network controller 110 may include a device manager 111 configured to manage one or more network devices, such as the network device 120, an inventory system 130, and/or apps 150 (applications, for e.g., the OSS of FIG. 1, etc.), but is not limited thereto. For example, the apps 150 (e.g., the OSS of FIG. 1) may be present as a separate component and may interact with the network controller 110 using messaging protocols such as http, https, RESTCONF, etc., but is not limited thereto. Further, other components may be included in the network controller 110, such as internal applications e.g., for provisioning, fault and performance monitoring, resource optimization, service quality assurance, etc.

Operations S3010 to S3070 correspond to a scenario wherein a new network device is added to the network and the network inventory system, but the example embodiments are not limited to the operations shown in FIG. 3.

According to at least one example embodiment, in operation S3010, a network controller, such as the network controller 110 of FIG. 1, transmits an initial configuration message to at least one new network device, such as the network device 120 of FIG. 1, to be added to a network controlled by the network controller 110. The initial configuration message may include initial configuration settings and/or information for the new network device 120, such as QoS parameters, network services, subscribers to the network services, port and/or interface configuration, identifiers, etc. In operation S3020, the network device 120 may transmit an acknowledgement message to the network controller 110 in response to the receipt of the initial configuration settings, the acknowledgement message indicating that the initial configuration settings and/or information have been implemented in the network device 120. Upon receipt of the acknowledgement message from the network device 120, in operation S3030, the network controller 110 (and/or the device manager 111) transmits a notification to the inventory system 130 indicating that the acknowledgement message was received to the initial configuration. In operation S3040, the inventory system 130 creates a new record and/or entry in the inventory database 140 for the new network device 120.

In the event that no acknowledgement message was received from the network device 120 in response to the initial configuration message transmitted in operation S3010, the network controller 110 does not transmit any notification to the inventory system 130, and instead, the network controller 110 may re-transmit the initial configuration message after a desired time interval, may transmit an error message to the network operator, a network administrator, etc., but the example embodiments are not limited thereto, in order to guarantee that data records associated with the network device 120 in the inventory system are accurate and are not updated until the network device 120 confirms that the initial configuration settings have been implemented.

In operation S3050, the inventory system 130 (and/or the network controller 110) may trigger a full synchronization operation, e.g., transmit a synchronization message, for all cache templates associated with the network device 120 to the device manager 111, and the device manager 111 may forward the synchronization message to the network device 120. Alternatively, the network controller 110 may transmit the synchronization message to the network device 120 directly. In response, in operation S3060, the network device 120 and/or the device manager 111 may transmit a response to the synchronization message to the network controller 110 and/or the inventory system 130, wherein the response message originating from the device manager 111 may include configuration information corresponding to the cache templates (e.g., provisioned in the device manager 111) associated with the network device 120 and an incremented and/or updated cache sequence number associated with the cache template and the network device 120, while the response message originating from the network device 120 may include state and/or operational information corresponding to each of the cache templates (e.g., provisioned in the network device 120) associated with the network device 120, such as device power status (e.g., power on/power off/sleep mode, etc.), connectivity information, network upload/download speed information, IP address, MAC address, serial number, etc., and also includes an incremented and/or updated cache sequence number associated with the cache template and the network device 120. In the event that the response message in S3060 is transmitted from the network device 120, the response message may be directly sent to the inventory system 130 or may be sent to the device manager 111 which forwards it appropriately to the inventory system 130. In operation S3070, the inventory system 130 updates the data records associated with the network device 120 in the inventory database 140 shown in FIG. 1 based on the configuration information (originated from the device manager 111) and/or state and/or operational information (originated from the network device 120) contained in the response message(s). The data records are updated in the table(s) for the relevant cache templates that are shown to be part of the inventory database 140 in FIG. 1, but are not limited thereto.

Operations S3110 to S3150 correspond to a scenario wherein the configuration of the network device is updated by the network, e.g., the configuration update of the network device may be provided by an application external to the network controller 110, etc., but the example embodiments are not limited to the operations shown in FIG. 3, and for example, the configuration update may be provided a network application installed on and/or executed by the network controller 110, etc.

In operation S3110, the network controller 110 (and/or an app 150 external to or within the network controller 110) may transmit a configuration update message for the network device 120 to the device manager 111, but is not limited thereto, and for example, the configuration update message may be transmitted to the network device 120 directly. Assuming that the configuration update message was transmitted to the device manager 111, the device manager 111 may forward the configuration update message to the network device 120 in operation S3120. In operation S3130, the network device 120 may implement the configuration update included in the configuration update message and transmit an acknowledgement message to the network controller 110 and/or the device manager 111, etc. In response, the network controller 110 and/or the device manager 111 may commit (e.g., save, write, etc.) the configuration update to the data records corresponding to the network device 120 in the inventory system 130 by sending one or more change notifications (and/or on-change notification) to the inventory system 130 wherein, according to at least one example embodiment, change notification(s) are sent separately for changes corresponding to each impacted cache template per network device 120, but the example embodiments are not limited thereto, and for example, all changes for a plurality of cache templates for a desired network device 120 may be included in the same change notification, etc.

According to some example embodiments, in the event that multiple configuration changes have been made in the network device 120 that correspond to different cache templates for the particular network device 120, the network controller 110 and/or the device manager 111 transmits multiple change messages to the inventory system 130, wherein each change message corresponds to a single cache template for the relevant network device 120, but the example embodiments are not limited thereto. The inventory system 130 then updates the inventory database 140 based on the change message(s) received from the network controller 110 and/or the device manager 111. In other words, the inventory system 130 updates the relevant records/records in the table(s) for the relevant cache templates that are included in the inventory database 140 in FIG. 1, but the example embodiments are not limited thereto.

If no acknowledgement message was received from the network device 120 in response to the configuration update message, the network controller 110 does not commit (e.g., save, write, etc.) the configuration update in the inventory system 130, and instead, for example, may re-transmit the configuration update message to the network device 120 after a desired time interval, etc.

In operation S3140, when the state and/or operational information of the network device 120 has changed and/or will change (e.g., the network device 120 will power down in the near future, enter sleep mode in the near future, etc.), the network device 120 transmits a change notification/message (and/or an "on-change" message, etc.), indicating that one or more state and/or operational information values have been changed, modified, updated, etc. In the event that multiple changes have occurred in the network device 120 that correspond to different cache templates, the network device 120, for example, transmits multiple change messages to the inventory system 130 or to the network controller 110 which may, in turn, forward it to the inventory system 130, wherein each change message corresponds to a single cache template associated with the network device 120, but the example embodiments are not limited thereto.

For example, as shown in FIG. 4, the change message may include a message header including information such as, the version number of the messaging protocol used, e.g., IPFIX version number, etc., the total length of the message, the export time, the sequence number of the message, an observation domain ID number, etc., but is not limited thereto. The example layout of the change message for a particular cache template is illustrated in FIG. 5. This template may be exchanged between the sender and the receiver (e.g., a network device 120 and the network controller 110, etc.) at the start of a communication session, and helps the receiver of the message to decode the change message properly. Further, the change message may include a data record header including information such as a set ID indicating the cache template that the change message corresponds to and/or is associated with, etc. Additionally, the change message may include one or more data records associated with the respective cache template for the network device 120, e.g., data record 1 to data record n as shown in FIG. 4, but the example embodiments are not limited thereto. For each data record included in the change message, there may be a header associated with the data record instance. For example, the header may include a presence bitmap which is a bitmap that indicates whether a corresponding data field in the data record is valid or invalid (to be discussed in greater detail in connection with FIG. 6), a collection time stamp denoting the time at which the change occurred in the data record, a cache template sequence number which is incremented by a desired value (e.g., incremented by "1" for every change message transmitted by the network device for the respective cache template, or incremented by 1 for every data record instance present in the change message, etc.) used to determine whether any change messages for the cache template for the network device 120 have failed to reach the inventory system 130.

Additionally, the data record header may include a record type field indicating whether the message is a "change message," a "sync response message," an "audit message," etc., a delete flag to indicate the deletion of an inventory record (e.g., a data record having this flag set to true indicates that the corresponding inventory data is to be deleted from the inventory database 140, etc.), and/or a last message flag to indicate whether the particular data record is the last data record, etc., but the example embodiments are not limited thereto. For example, the last message flag is of significance in a sync response message, wherein the contents may span more than one message, and indicates to the receiver of the message (e.g., the inventory system 130 and/or the network controller 110, etc.) that all of the inventory data corresponding to the cache template for the specific network device 120 have been received and the full sync operation is complete. In response to the last message flag, the inventory system 130 and/or the network controller 110 may then update the inventory database 140 accordingly, and also update the relevant collection state table record with the indication that full sync has been completed, etc.

Additionally, each change message includes a cache sequence number (e.g., sequence number, message sequence number, etc.) associated with the respective cache template and the respective network device, which is incremented for each change message transmitted by the network device 120 for that cache template. For example, a first change message transmitted by the network device 120 for a first cache template may have a sequence number of "000001" and a second change message transmitted by the network device 120 for the first cache template may have a sequence number of "000002," etc. However, if the network device 120 transmits a first change message for a second cache template, the sequence number of that change message may also have a sequence number of "000001" and the sequence number for a second change message for the second cache template transmitted by the network device 120 may be "000002," etc. According to at least one example embodiment, if a change message includes a plurality of data records for a particular cache template, e.g., the first cache template, a separate sequence number may be assigned to each of the data records included in the change message, e.g., a first data record of the first cache template of a first change message may have a sequence number of "000001," a second data record of the first cache template may have a sequence number of "000002," and the first data record of the first cache template of a second change message may have a sequence number of "000003," and the second data record of the first cache template of the second change message may have a sequence of "000004," etc.

In operation S3150, the network controller 110 may receive the change message from the network device 120 and/or may be forwarded the change message by the device manager 111, and may compare the sequence number included in the received change message with the sequence number for the last change message received from the same network device 120 for the same cache template. If the sequence numbers are in sequence (e.g., the last received change message for the relevant cache template has a sequence number of "000001" and the sequence number of the change message received in operation S3150 for the relevant cache template is "000002"), then the network controller 110 determines that all change messages from the network device 120 have been properly received, and in operation S3150, the network controller 110 commits the changes indicated in the change message to the appropriate data records in the inventory system 130, etc. by sending the appropriate change notifications to the inventory system 130. The inventory system 130, in turn, updates the relevant tables in the inventory database 140 based on the received change message. Similarly, for configuration updates, when the network controller 110 and/or device manager 111 sends change notifications to the inventory system 130, the inventory system 130 may compare the sequence number included in the received change message with the sequence number for the last change message received from the network controller 110 and/or device manager 111 for the same network device 120 for the same cache template. If the sequence numbers are in sequence (e.g., the last received change message has a sequence number of "000001" and the sequence number of the change message received in operation S3150 is "000002"), then the inventory system 130 determines that all change messages from the network controller 110 and/or device manager 111 have been properly received, and in operation S3150, the inventory system 130 commits the changes indicated in the change message to the inventory database 140.

In operation S3160, if the sequence numbers are out of sequence (e.g., the last received change message has a sequence number of "000001" and the sequence number of the change message received in operation S3140 from the network device 120 is "000005"), then the inventory system 130 determines that an error has occurred and one or more change messages from the network device 120 have not been received. In operation S3170, the inventory system 130 triggers a full synchronization for the cache template for which the sequence number was out of sequence with the network device 120, and in operations S3180 to S3190, the network device 120 transmits the response to the full synchronization message for the relevant cache template and the network controller 110 and/or the inventory system 130 updates the inventory database 140 with the inventory information included in the response to the full synchronization message from the network device 120, similar to the full synchronization operations S3050 to S3070.

Similarly, in the case of change messages containing data records related to configuration changes originating from the network controller 110 and/or device manager 111 after receiving the acknowledgement S3130 from the network device 120 for a configuration update sent in operation S3120, the inventory system 130 determines if the sequence number in the change message is in sequence or not. If the sequence numbers are out of sequence (e.g., the last received change message has a sequence number of "000001" and the sequence number of the change message received now from the network controller 110 and/or device manager 111 is "000005"), then the inventory system 130 determines that an error has occurred and one or more change messages from the network controller 110 and/or device manager 111 have not been received, and triggers a full synchronization, similar to the operations S3160 to S3190 discussed above.

It may be noted that operation S3140 may be initiated by the network device 120 to send a change notification when one or more state and/or operational data has changed even when no configuration update was initiated (e.g., operations S3110 to S3130 did not take place), and in this case also, operation S3150, and optionally operations S3160 to S3190 will be initiated.

Operations S3210 to S3250 correspond to a scenario wherein the network device 120 is upgraded (e.g., a software upgrade and/or firmware upgrade has been installed on the network device 120, a new hardware module has been installed on the network device 120, etc.), but the example embodiments are not limited to the operations shown in FIG. 3.

In operation S3210, the network device 120 and/or the device manager 111 transmits a notification to the network controller 110 and/or the inventory system 130 that the network device 120 has been upgraded. In operation S3220, the inventory system 130 updates the device information (e.g., device details, etc.) associated with the network device 120 in the inventory database 140. In operation S3230, the inventory system 130 triggers a full-synchronization operation towards the network controller 110 and/or device manager 111 for the network device 120 in response to the upgrading of the network device 120, similar to the full-synchronization operation discussed in connection with operations S3050 to S3070. The full synchronization request for all cache templates associated with state and/or operational information for the relevant network device is forwarded by the network controller 110 and/or device manager 111 to the network device 120 as part of operation S3230. In operation S3240, the network device 120 transmits and/or the device manager 111 forwards the up-to-date state and/or operational information for each cache template associated with the network device 120 to the inventory system 130. Similarly, the network controller 110 and/or device manager 111 transmits the up-to-date configuration information for the network device 120 to the inventory system 130. In operation S3250, the inventory system 130 updates the relevant data records associated with the network device 120 in the inventory database 140, etc.

Now moving to operations S3310 to S3320, these operations correspond to a scenario wherein an audit is triggered by the network device 120, but the example embodiments are not limited to the operations shown in FIG. 3.

In operation S3310, the device manager 111 and/or the network device 120 may start a timer (e.g., an audit timer) which is set for a desired time interval (e.g., 30 minutes, 1 hour, etc.) for each cache template active for the network device 120. Upon the expiration of the timer (e.g., the desired time interval elapses), the network device 120 will determine whether it has transmitted a change message associated with the respective cache template within the just expired desired time interval. If the network device 120 has transmitted a change message for the respective cache template within the just expired desired time interval, the network device 120 resets the timer and returns to operation S3310. Similarly, upon the expiration of the timer (e.g., the desired time interval elapses), the device manager 111 will determine whether it has transmitted a change message associated with the respective cache template within the just expired desired time interval. If the device manager 111 has transmitted a change message for the respective cache template within the just expired desired time interval, the device manager 111 resets the timer and returns to operation S3310.

In the event that the network device 120 and/or device manager 111 has not transmitted a change message for the respective cache template within the just expired desired time interval, the network device 120 and/or device manager 111 transmits an audit message for the cache template to the network controller 110 and/or inventory system 130, etc. According to some example embodiments, the audit message is a duplicate copy of the last transmitted change message transmitted by the network device 120 for the respective cache template but is not limited thereto. Referring to FIGS. 4 and 6, according to other example embodiments, the audit message may be a compressed and/or reduced size version of the last transmitted change message transmitted by the network device 120, but is not limited thereto.

More specifically, the record type of the message may be set to "audit message," the cache template sequence number will be copied from the last transmitted change message, and the presence bitmap field(s) each corresponding to a respective data record included in the cache template of the audit message may be set as shown in FIG. 6, wherein each bit of the presence bitmap corresponds to a data field of the data record and indicates whether the data field is a changed, modified, and/or updated field or not. For example, if no change has occurred for the data field, the bit corresponding to the data field in the presence bitmap is set to "0," "NULL," or equivalent value and the data field will be empty, set to a NULL value or garbage data, etc. If a change had occurred in the data field, the bit corresponding to the data field in the presence bitmap is set to "1," or equivalent value, and the data field will contain the changed value. In the case of audit messages, only the cache sequence number (e.g., the sequence number sent in the most recent change message for that cache template) and the record type (e.g., audit type) fields have valid content, hence the bits corresponding to those fields alone will be set to "1". However, the example embodiments are not limited thereto, and for example, the presence bitmap may also be used with change messages, full synchronization messages, etc.

Referring back to FIG. 3, in operation S3320, the inventory system 130 will determine whether the cache template sequence number included in the audit message matches the cache template sequence number included in the last received change message from the network device 120 corresponding to the same cache template. In the event that the two cache template sequence numbers match, the inventory system 130 has confirmed that the state and/or operational information of the network device 120 for the cache template is up-to-date, and the method returns to operation S3310. In the event that the two cache template sequence numbers do not match, the inventory system 130 determines that an error has occurred with regards to the change messages, e.g., at least one previous change message was lost, dropped, not received, etc., and the inventory system 130 triggers a full synchronization operation, similar to operations S3050 to S3070, etc., so that the data records for the cache template for the network device 120 are brought up-to-date.

Operations S3410 to S3430 correspond to a scenario wherein the network device 120 is removed from the network, but the example embodiments are not limited to the operations shown in FIG. 3. In the event that the audit message originated from the device manager 111 for a cache template corresponding to configuration data of a specific network device 120, the inventory system 130 will determine whether the cache template sequence number included in the audit message matches the cache template sequence number included in the last received change message from the device manager 111 corresponding to the same cache template for that device. In the event that the two cache template sequence numbers match, the inventory system 130 has confirmed that the config information of the specific network device 120 for that cache template is up-to-date, and the method returns to operation S3310.

In operation S3410, the network controller 110 and/or the application 150 initiates a removal of the network device 120 from the network which is transmitted to the device manager 111 and/or the network device 120. In operation S3420, the network device 120 disconnects from the network, if not previously done, and for example, may connect to a new network as part of a handover procedure, etc. Additionally, the device manager 111 deletes and/or removes all records related to the network device 120, but is not limited thereto. Further, the device manager 111 transmits a notification to the network controller 110 and/or the inventory system 130 acknowledging the removal message and indicating that the network device 120 has been removed. In operation S3430, in response to the acknowledgement message from the device manager 111, the network controller 110 commits the removal of the network device 120 in the inventory system 130 by sending a notification to the inventory system 130. The inventory system 130 then updates the inventory database 140, by for example, deleting all data records corresponding to the network device 120 from the relevant tables of the inventory database 130, such as the relevant device table, collection status table, etc., and/or by deactivating all data records corresponding to the network device 120 in the inventory database 140, etc.

What is claimed is:

1. A network node comprising:
memory storing computer readable instructions; and
processing circuitry configured to execute the computer readable instructions to cause the network node to,
transmit a configuration message to at least one network device of a plurality of network devices, the configuration message including updated configuration information for the at least one network device,
determine whether to update a network inventory system based on a response to the configuration message, and
update a record included in the network inventory system associated with the at least one network device based on results of the determination, the updating including updating the record with the updated configuration information.

2. The network node of claim 1, wherein the network node is further caused to:
receive an acknowledgement message from the at least one network device in response to the configuration message; and
update the record associated with the at least one network device in response to the received acknowledgement message.

3. The network node of claim 1, wherein the network node is further caused to:
receive a change message from the at least one network device, the change message including changed state information of the at least one network device and a cache sequence number associated with the at least one network device;
determine whether the cache sequence number included in the change message is in sequence with a previous cache sequence number included in a last message received from the at least one network device; and
update the record associated with the at least one network device in the network inventory system with the changed state information based on results of the determination.

4. The network node of claim 3, wherein the network node is further caused to:
transmit a synchronization request to the at least one network device in response to the cache sequence number associated with the at least one network device included in the change message being out of sequence from the previous cache sequence number associated with the at least one network device;
receive full state information from the at least one network device in response to the synchronization request; and
update the record associated with the at least one network device in the network inventory system with the full state information.

5. The network node of claim 1, wherein
the memory is configured to store the network inventory system.

6. The network node of claim 1, wherein
the network inventory system is stored on a central network node; and
the network node is further caused to update the network inventory system by transmitting a system update message to the central network node, the system update message including the update to the network inventory system.

7. The network node of claim 1, wherein the network node is further caused to:
receive an audit message from the at least one network device based on a desired time period threshold and a length of time since a last transmitted message was sent by the at least one network device, the audit message being a copy of the last transmitted message sent by the at least one network device.

8. The network node of claim 7, wherein the network node is further caused to:
transmit a synchronization request to the at least one network device in response to a cache sequence number included in a last received message associated with the at least one network device from the at least one network device not matching a cache sequence number in the last transmitted message associated with the at least one network device.

9. A network node comprising:
memory storing computer readable instructions; and
processing circuitry configured to execute the computer readable instructions to cause the network node to,
transmit a configuration message to at least one network device of a plurality of network devices, the configuration message including updated configuration information for the at least one network device,
determine whether to update a record associated with the at least one network device in a network inventory system based on a response to the configuration message,
receive a change message from the at least one network device, the change message including changed state information of the at least one network device and a cache sequence number associated with the at least one network device,
determine whether the cache sequence number included in the change message is in sequence with a previous cache sequence number included in a last message received from the at least one network device, and
update the record associated with the at least one network device in the network inventory system with at least one of the changed state information and the updated configuration information based on results of the determinations.

10. The network node of claim 9, wherein the network node is further caused to:
transmit a synchronization request to the at least one network device in response to the cache sequence number included in the change message being out of sequence from the previous cache sequence number associated with the at least one network device;
receive full state information from the at least one network device in response to the synchronization request; and
update the record associated with the at least one network device in the network inventory system with the full state information.

11. The network node of claim 9, wherein the network node is further caused to:
- receive an acknowledgement message from the at least one network device in response to the configuration message; and
- update the record associated with the at least one network device in response to the received acknowledgement message.

12. The network node of claim 9, wherein
the memory is configured to store the network inventory system.

13. The network node of claim 9, wherein
the network inventory system is stored on a central network node; and
the network node is further caused to update the network inventory system by transmitting a system update message to the central network node, the system update message including the update to the network inventory system.

14. The network node of claim 9, wherein the network node is further caused to:
- receive an audit message from the at least one network device based on a desired time period threshold and a length of time since a last transmitted message was sent by the at least one network device, the audit message being a copy of the last transmitted message sent by the at least one network device.

15. The network node of claim 14, wherein the network node is further caused to:
- transmit a synchronization request to the at least one network device in response to a cache sequence number included in a last received message from the at least one network device not matching a cache sequence number in the last transmitted message associated with the at least one network device.

16. A network device comprising:
memory storing computer readable instructions; and
processing circuitry configured to execute the computer readable instructions to cause the network device to,
- determine whether a change in state has occurred in the network device, and
- transmit a change message to a network node in response to the determined change in state of the network device, the change message including changed state information of the network device and a cache sequence number associated with the network device, the change message enabling the network node to,
  - determine whether the cache sequence number included in the change message is in sequence with a previous cache sequence number included in a last message received from the network device, and
  - update a record associated with the network device included in a network inventory system with the changed state information based on results of the determination.

17. The network device of claim 16, wherein the network device is further caused to:
- receive a synchronization request from the network node in response to the cache sequence number included in the change message not being in sequence with the previous cache sequence number.

18. The network device of claim 17, wherein the network device is further caused to:
- transmit full state information to the network node, the transmitting enabling the network node to,
  - update the record associated with the network device in the network inventory system with the full state information of the network device.

19. The network device of claim 16, wherein the network device is further caused to:
- receive a configuration message from the network node, the configuration message including updated configuration information for the network device; and
- transmit an acknowledgement message to the network node in response to the configuration message, the transmitting the acknowledgement message enabling the network node to,
  - update the record associated with the network device in response to the transmitted acknowledgement message, the updating the network inventory system including updating the configuration information for the network device stored in the network inventory system.

20. The network device of claim 16, wherein the network device is further caused to:
- transmit an audit message to the network node based on a desired time period threshold and a length of time since a last transmitted message was sent by the network device, the audit message being a copy of a last transmitted message sent by the network device; and
- receive a synchronization request from the network node in response to a cache sequence number included in a last received message received by the network node from the network device not matching a cache sequence number in the last transmitted message.

* * * * *